United States Patent
Yurgil et al.

(10) Patent No.: US 7,051,859 B2
(45) Date of Patent: May 30, 2006

(54) METHODS AND APPARATUS FOR HILL-HOLDING TRANSMISSION

(75) Inventors: James R. Yurgil, Livonia, MI (US); David Gordon Evans, Rochester, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/229,187

(22) Filed: Aug. 27, 2002

(65) Prior Publication Data

US 2004/0043859 A1  Mar. 4, 2004

(51) Int. Cl.
*B60K 41/26*  (2006.01)
(52) U.S. Cl. .................................. 192/219.2
(58) Field of Classification Search .............. 192/219.2
See application file for complete search history.

(56) References Cited

U.S. PATENT DOCUMENTS

| | | | | |
|---|---|---|---|---|
| 4,879,925 A | * | 11/1989 | Taga et al. ................ | 192/219.2 |
| 5,586,954 A | * | 12/1996 | Iwata et al. .................... | 477/93 |
| 5,630,772 A | * | 5/1997 | Tsukamoto et al. ........... | 477/95 |
| 5,741,200 A | * | 4/1998 | Taniguchi et al. ............ | 477/93 |
| 5,788,596 A | | 8/1998 | Robinson et al. | |
| 6,039,673 A | * | 3/2000 | Mikami et al. ............... | 477/93 |

* cited by examiner

*Primary Examiner*—Dirk Wright
(74) *Attorney, Agent, or Firm*—Christopher DeVries

(57) ABSTRACT

The hill-holding mechanism of the present invention comprises an apparatus and methodology for actuating a transmission control element to prevent the output shaft of an automatic transmission in a hybrid vehicle from rotating under certain predetermined circumstances.

11 Claims, 6 Drawing Sheets

| | 210 | 215 | 220 | 225 | 230 | 260 | 240 | 245 |
|---|---|---|---|---|---|---|---|---|
| 1 | | X | X | | X | | X | X |
| 2 | | X | X | | | X | X | |
| 3 | | X | X | X | | | X | |
| 4 | | | X | X | | X | | |
| R | X | | | | X | | | |
| H | | | | | | X | | X |

METHODS AND APPARATUS FOR HILL-HOLDING TRANSMISSION

TECHNICAL FIELD

The present invention generally relates to an automatic transmission, and more particularly to methods and apparatus for controlling an automatic transmission in a hybrid vehicle.

BACKGROUND OF THE INVENTION

Certain new types of vehicles, known as hybrid vehicles, employ a combustion engine coupled with a combination electric motor-generator in order to provide vehicle locomotion. In some of these hybrid or mild-hybrid powertrain systems, an electric motor-generator system replaces the conventional starter motor and alternator. When the hybrid vehicle is decelerating or is stopped, the fuel flow to the engine is shut off to improve fuel economy. While the hybrid vehicle is at a standstill, the engine is not turning. The motor-generator system of the hybrid vehicle is implemented to enable this fuel cutoff feature while minimally affecting drivability.

In a mild-hybrid powertrain with an automatic transmission, when the brake pedal is released after a stop, the motor-generator system spins up the engine, and creeps the vehicle forward, similar to a conventional vehicle with an automatic transmission. The engine combustion can be commenced after some period of time, or when the accelerator pedal is depressed. When the driver accelerates, the combustion engine restarts automatically and the hybrid vehicle can be driven in a conventional manner. When the combustion engine is running, the motor-generator acts as a generator to supply the vehicle's electrical power requirements, as well as recharging the on-board battery system. Whenever the combustion engine is off, the hybrid vehicle's electrical loads (fans, radio, etc.) are supported by the battery system and a DCDC converter. Though the term "Hybrid Powertrains" is often used to refer to hybrid-electric powertrains, other forms of hybridization (e.g., hydraulic) can be considered for this application.

While this new hybrid automotive design is advantageous from a fuel economy perspective, it can also present a need for additional design considerations in certain operational situations. One such situation is when the hybrid vehicle's engine shuts off as the vehicle comes to a stop on an incline. Since the combustion engine is typically shut off whenever the hybrid vehicle is stopped, the normal forward "creep" associated with the torque from the transmission in a standard vehicle is absent. Any vehicle facing uphill will have a greater tendency to roll backwards whenever the engine shuts off when compared to the same situation with the engine running. This is a rare event on a non-hybrid vehicle and only occurs if the combustion engine inadvertently stalls. On hybrid vehicles, an increase in brake pedal effort combined with a fast engine restart strategy on a brake release is commonly used to compensate for the loss of "creep" torque and manage backward movement of the vehicle. However, even with the best of the currently implemented techniques, there may be a slight backward rolling movement for hybrid vehicles idling or stopped on an incline.

In view of the foregoing, it should be appreciated that it would be desirable to provide methods and apparatus for minimizing the brake pedal effort required for controlling the backwards movement of a hybrid vehicle idling or stopped on an incline. Furthermore, additional desirable features will become apparent to one skilled in the art from the foregoing background of the invention and following detailed description of a preferred exemplary embodiment and appended claims.

SUMMARY OF THE INVENTION

The hill-holding mechanism of the present invention comprises an apparatus and methodology for actuating a transmission control element to prevent the output shaft of an automatic transmission in a hybrid vehicle from rotating under certain pre-determined circumstances.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of a preferred exemplary embodiment of the invention is mainly exemplary in nature and is not intended to limit the invention or the application or use of the invention.

Most automatic transmissions are equipped with an electronic control system that uses electronic signals to communicate with and selectively activate or de-activate a series of switches, solenoids, and hydraulic systems that are used to engage the various gears of an automatic transmission. This electronic control system typically involves one or more microprocessors and various types of computer memory (RAM, ROM, etc.) for storing status flags and various other pieces of information used by the microprocessors to implement the functionality of the automatic transmission.

The hill-holding mechanism of the present invention takes advantage of the existing architecture of the control system and the transmission to implement the desired functionality. In the most preferred embodiments of the present invention, the hill-holding mechanism selectively deploys a transmission control band in combination with a one-way roller clutch to prevent the output shaft of the automatic transmission from rotating backwards. By carefully selecting when to deploy this specific combination of elements, the hill-holding mechanism of the present invention is only activated when the hybrid vehicle is in those conditions and circumstances that may require this specific functionality.

Figure 1:
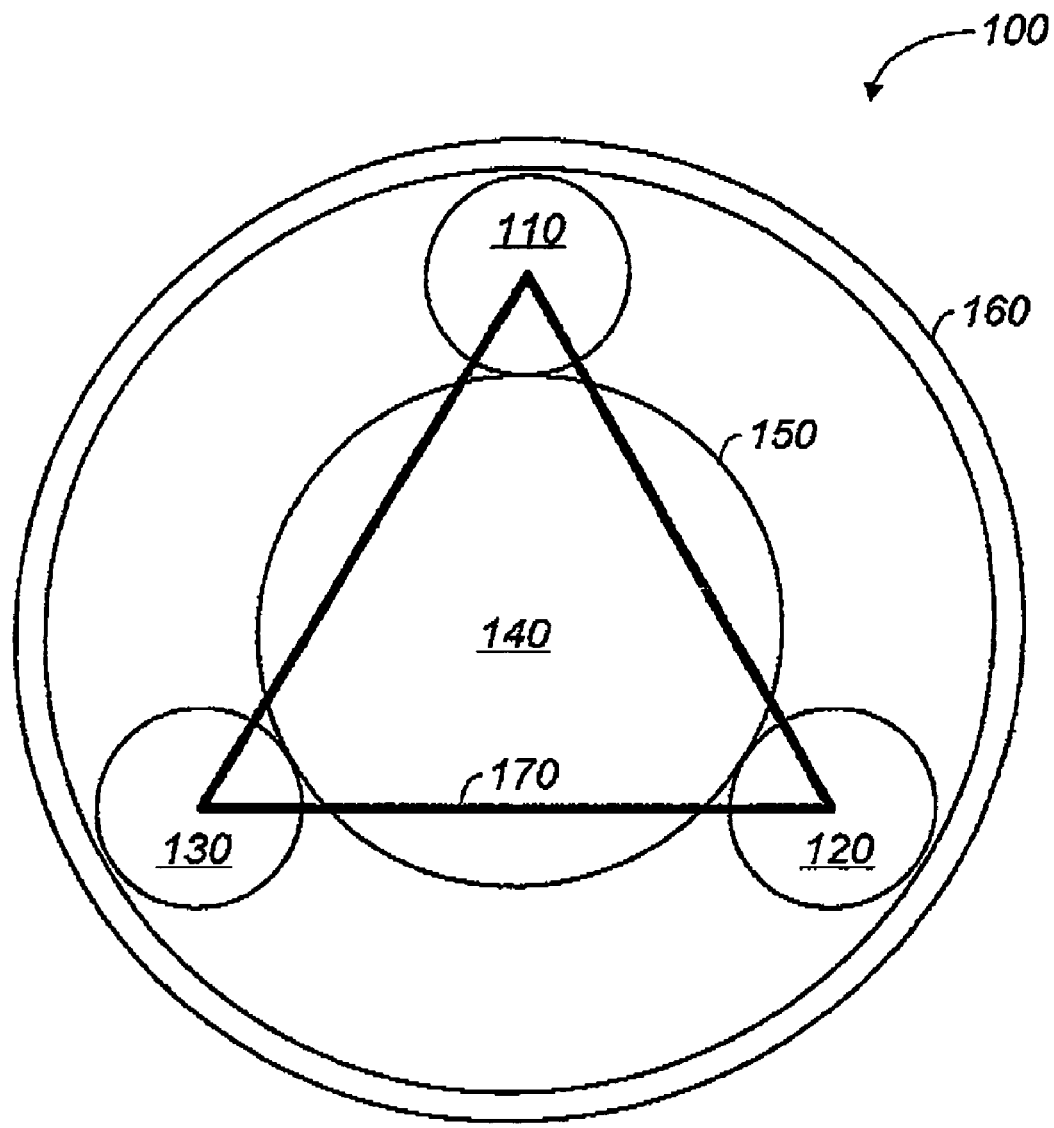
FIG. 1 is a schematic diagram of an automatic transmission including the components of a hill-holding mechanism in accordance with a preferred exemplary embodiment of the present invention.

Referring now to FIG. 1, a schematic diagram of the planetary gear set 100 for a four-speed automatic transmission is shown. A typical four-speed transmission will employ two planetary gear sets 100. Planetary gear set 100 is depicted to illustrate the concepts behind controlling an automatic transmission for the purpose of implementing the hill-holding mechanism according to the preferred exemplary embodiments of the present invention. The various elements of planetary gear set 100 are used in combination with additional transmission components such as a series of clutches to provide various different gearing options for an automatic transmission.

Planetary gear set 100 comprises: a ring gear 160; a plurality of planet gears 110, 120, and 130; a sun gear 140; and a planet carrier 170. Planet gears 110 cooperate with sun gear 140 and ring gear 160. Planet carrier 170 is connected to each of planet gears 110. If any two of the three elements, sun gear 140, ring gear 160, and planet carrier 170 are made to rotate at the same angular velocity, the remaining element must also rotate at the same velocity. Accordingly, in order to implement the hill-holding mechanism of the present invention, two of the three elements, sun gear 140, ring gear 160, and planet carrier 170 must be prevented from rotating. This will be accomplished in certain circumstances as determined by a series of electronic signals provided by the electronic control system of the automatic transmission.

Figure 2:
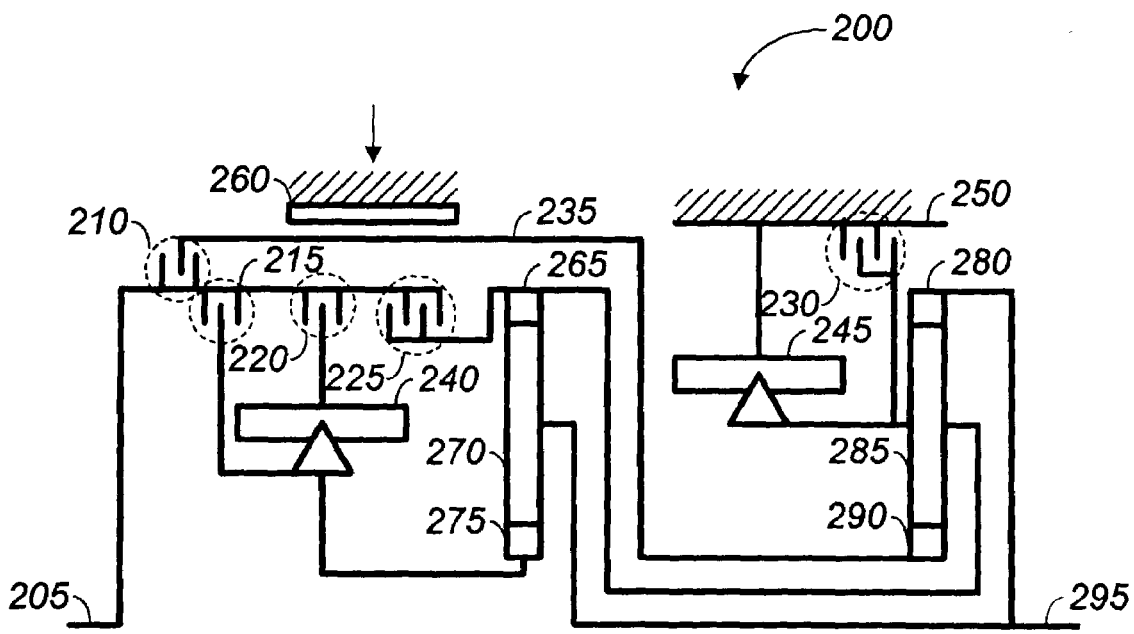
FIG. 2 is a schematic diagram detailing the components used to implement a hill-holding mechanism in accordance with a preferred exemplary embodiment of the present invention.

Referring now to FIG. 2, a schematic diagram of an automatic transmission 200 suitable for implementing a hill-holding mechanism according to a preferred exemplary embodiment of the present invention is shown. While the various major components of an automatic transmission are shown and described in FIG. 2, it should be understood that all components necessary for full functionality are not shown and the connections shown are representations only. In many implementations, the connections between various components is accomplished indirectly, using the interaction of various components such as gears and interconnecting drums which are not shown in FIG. 2.

Transmission 200 comprises: an input shaft 205; an output shaft 295; a plurality of clutches 210, 225, 220, 225, and 230; a reverse clutch drum 235; a transmission housing 250; a transmission control element 260; two sun gears 275 and 290; two ring gears 265 and 280; a plurality of one-way roller clutches 240 and 245; and two planet carriers 270 and 285.

Input shaft 205 is connected to the engine (not shown) and the motor-generator (not shown) of the hybrid vehicle and output shaft 295 is connected to a wheel axle (not shown), thereby allowing the locomotive force of the engine to be transferred from the engine to the wheels of the hybrid vehicle. Reverse clutch drum 235 is a rotating drum-like object that rotates at the same velocity as sun gear 290. The rotation of reverse clutch drum 235 can be stopped by applying transmission control element 260 to the surface of reverse clutch drum 235. Transmission control element 260 is also known as a "2–4 Band" because it is typically actuated only when the automatic transmission is placed into 2nd or 4th gear. Transmission control element 260 is selectively actuated by a signal from the electronic control system of transmission 200. Sun gears 275 and 290 and ring gears 265 and 280 are similar in function as described in conjunction with FIG. 1. One-way roller clutches 240 and 245 are sprag clutches or other similar roller-type clutches, well know to those skilled in the art. Output shaft 295 is directly connected to ring gear 280. Sun gear 290 is connected to reverse clutch drum 235. One-way roller clutch 245 is connected to planet carrier 285.

The implementation of the hill-holding mechanism can be explained in the context of these various elements. When output shaft 295 tries to rotate in a reverse direction, as would be the case when the hybrid vehicle is stopped or idling on a hill with the front of the vehicle facing uphill, one-way roller clutch 245 is grounded to transmission housing 250, thereby ensuring that the angular velocity of one-way roller clutch 245 is zero. "Grounded" means one-way roller clutch 245 is forced against the housing in such a way as to prevent movement. This is the normal operation for one-way roller clutch 245, with or without the implementation of the hill-holding mechanism of the present invention. This also means that planet carrier 285 is also stationary and has a velocity of zero. To activate the hill-holding mechanism of the present invention, sun gear 290, which would otherwise rotate in a direction opposite to output shaft 295, is grounded to the transmission housing by the application of transmission control element 260 to reverse clutch drum 235, thereby ensuring that the angular velocity of sun gear 290 is also zero.

As previously explained, once sun gear 290 and one-way roller clutch 245 are both grounded to the transmission housing, transmission 200 is effectively locked in place and output shaft 295 is held in place as well. This prevents any undesirable backwards rolling of the hybrid vehicle. In order to activate the hill-holding mechanism of the present invention, transmission control element 260 is engaged whenever the hybrid vehicle slows or stops. The specific details of engaging and disengaging the hill-holding mechanism of the present invention by actuating transmission control element 260 are discussed below in conjunction with the FIGS. 3–7.

Figure 3:
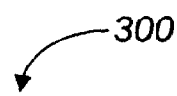
FIG. 3 is a truth table diagram illustrating the selection of the various components of FIG. 2 to implement various transmission functions, including a hill-holding mechanism in accordance with a preferred exemplary embodiment of the present invention.

Referring now to FIG. 3, a truth table 300 for implementing various automatic transmission functions for the automatic transmission depicted in FIG. 2, including a hill-holding mechanism according to a preferred exemplary embodiment of the present invention, is shown.

In table 300, each of the columns represent one of the various elements from FIG. 2 as designated by the like numbers for the given elements. Each of the rows in table 300 represents one selected gear of transmission 200 and illustrates which elements of transmission 200 are needed to implement the selected gear. The number "1" represents first gear, the number "2" represents second gear, the number "3" represents third gear, the number "4" represents fourth gear, the letter "R" represents reverse and the letter "H" represents the activation of the hill-holding mechanism of the present invention. An "X" in a given column/grid intersection of table 300 indicates that a specific element from FIG. 2 must be deployed to engage the selected gear of transmission 200. For example, to engage second gear of transmission 200 of FIG. 2, it is necessary to engage clutch 215, clutch 220, transmission control element 260, and one-way roller clutch 240.

To implement the hill-holding mechanism of the present invention, one-way roller clutch 245 is deployed in combination with transmission control element 260. It should be noted that additional elements, other than clutch 245 and transmission control element 260, might also be deployed. For example, clutches 215 and 220 may also be deployed without any adverse effect.

Figure 4:
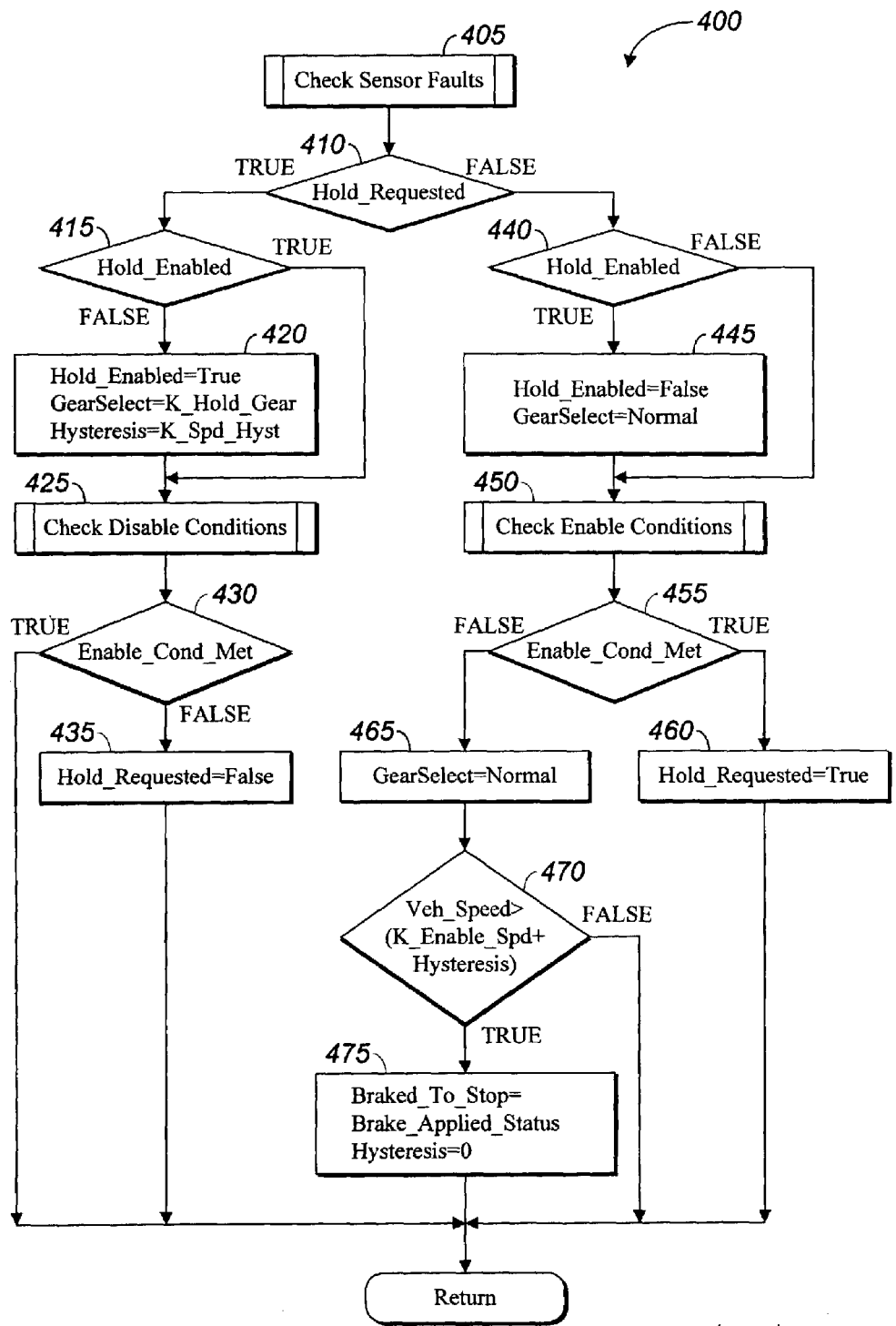
FIG. 4 is a flow chart illustrating a method of implement a hill-holding mechanism in accordance with a preferred exemplary embodiment of the present invention.

Referring now to FIG. 4, a method 400 for implementing a hill-holding mechanism according to a preferred exemplary embodiment of the present invention is shown. Method 400 is implemented in the electronic control system of the automatic transmission and is used to control and activate various function of the transmission in a hybrid vehicle. Various flags and variable elements are represented in method 400, and these variables represent storage locations in the memory space of the electronic control system. The electronic control system associated with the transmission will send various signals to the various components to actuate the hill-holding mechanism of the present invention, based on the status of the flags and variables and the operating condition of the hybrid vehicle.

At the start of method 400, certain variables are initialized to the following values to ensure the desired results: the Hold_Requested variable is assigned a value of "False," the Hold_Enabled variable is assigned a value of "False," the GearSelect variable is assigned a value of "Normal," the Braked_To_Stop variable is assigned a value of "False," and the Hysteresis variable is assigned a value of "0." The Hysteresis variable represents an offset for the speed of the hybrid vehicle and prevents undesired switching when the hybrid vehicle approaches the threshold for implementing the hill-holding mechanism of the present invention. These variables are initialized to ensure the proper functionality of the hill-holding mechanism for the initial execution of method 400. Other variables are also assigned values depending on the specific application. For the purposes of method 400, the K_Spd_Hyst variable is assigned a value of 7 MPH, the K_Hold_Gear variable is assigned a value of 2nd gear, and the K_Enable_Spd variable is assigned a value of 0.7 MPH. All variables with a prefix of "K" represent calibration values that can be set by an application engineer when the control system for the hill-holding mechanism is being designed. Additional variables are discussed in context below.

The first step of method 400 is to check for any vehicle sensor faults as represented by step 405. Step 405 involves determining whether or not a certain type of fault has been detected in the on-board diagnostic systems of the hybrid vehicle that is equipped with a transmission employing the hill-holding mechanism of the present invention. If any vehicle sensor faults are detected, a FaultDetected variable will be set to "True," otherwise the FaultDetected flag will be set to "False." If a vehicle sensor fault is detected, then method 400 will not proceed until the vehicle sensor fault has been cleared. Additional details about step 405 can be found in conjunction with the explanation of FIG. 7 below.

Step 410 of method 400 is decision point where the status of the Hold_Requested variable is checked. Following decision point 410 and based on the status of the Hold_Requested variable, the next step in method 400 will be either step 415 or step 440. In either case, the next step is to check the status of the Hold_Enabled variable to determine whether or not a request for hill-holding that has been requested will be implemented in steps 415 and 440.

In the case of step 415, if the status of the Hold_Enabled variable is "False," then method 400 proceeds to step 420 and the following variables are set to the following values: the Hold_Enabled variable is assigned a value of "True," the GearSelect variable is assigned a value of "K_Hold_Gear," and the Hysteresis variable is assigned a value of "K_Spd_Hyst." For this particular step, the value of K_Hold_Gear is 2nd gear and the value of K_Spd_Hyst is nominally 7 MPH. If, however, the value of the Hold_Enabled variable at step 415 is "True," that means the hill-holding mechanism had been previously enabled and the variables shown in step 420 have already been set elsewhere in method 400 and step 420 is not performed. In either case, once steps 415 and/or 420 have been completed, the value of the Hold_Enabled variable is "True" and the hill-holding mechanism will either be activated or will continue to be activated by a signal sent from the electronic control system to transmission control element 260 of FIG. 2. As previously explained, the electronic control system sends a signal to the control solenoid for transmission control element 260 of FIG. 2.

Following step 420 and a condition where the value of the Hold_Enabled variable is "True" for step 415, method 400 will proceed to step 425 to check the status of certain disable conditions that would prevent the hill-holding mechanism from being engaged. Step 425 will return a value of either "True" or "False" for the variable Enable_Cond_Met. Additional details about step 425 can be found in conjunction with the explanation of FIG. 5 below. If, the value of the Enable_Cond_Met variable is "True," then method 400 returns to the start to begin the process over again at step 405. From this point forward, the hill-holding mechanism is operational until disabled by a signal sent from the electronic control system to transmission control element 260 of FIG. 2. If, however, the value of the Enable_Cond_Met variable is "False," then method 400 moves on to step 435 and sets the Hold_Requested variable equal to "False" before returning to step 405 to the start to begin the process over again. If the Hold_Requested is "False," then the next time method 400 returns to step 410, method 400 will proceed to step 440 and/or 445 where the hill-holding mechanism will be deactivated or remain deactivated if previously deactivated by a signal sent from the electronic control system to transmission control element 260 of FIG. 2.

Returning now to step 410, if the status of the Hold_Requested variable is "False," then method 400 will proceed to step 440. As previously mentioned, step 440, like step 415, the status of the Hold_Enable variable is checked. In the case of step 440, if the status of the Hold_Enabled variable is "True," then method 400 proceeds to step 445 and the following variables are set to the following values: the Hold_Enabled variable is assigned a value of "False" and the GearSelect variable is assigned a value of "Normal." If, however, the status of the Hold_Enabled variable is "False," then method 400 proceeds to step 450 without initializing changing any values.

Like steps 405 and 425 above, step 450 is another sub-process of method 400. In this case, step 450 checks the status of the Enable_Cond_Met variable to determine whether or not the hill-holding mechanism can be activated and a value of either "True" or "False" will be returned for step 455. If the value of the Enable_Cond_Met variable is "False," then method 400 moves on to step 465 and sets the value of the GearSelect variable to "Normal." This allows the transmission to operate in the normal mode with the gear that would typically be selected for the operation of the vehicle. If, however, the value of the Enable_Cond_Met variable is "True," then method 400 moves on to step 460 and sets the Hold_Requested variable equal to "True" and then returns to step 405. After step 465, method 400 progresses to step 470. Step 470 is a decision point to determine if the value of the Veh_Speed variable is greater than the value of the K_Enable_Spd variable added to the value of the Hysteresis variable. If step 470 is false, then method 400 returns to step 405 and begins processing again. If, however, step 470 is true, then method 400 moves on to step 475 and sets the following variables to the following values: the Braked_To_Stop variable is assigned to the value of the Brake_Applied_Status variable and the Hysteresis variable is assigned a value of "0." Method 400 then returns to step 405 to continue processing.

Figure 5:
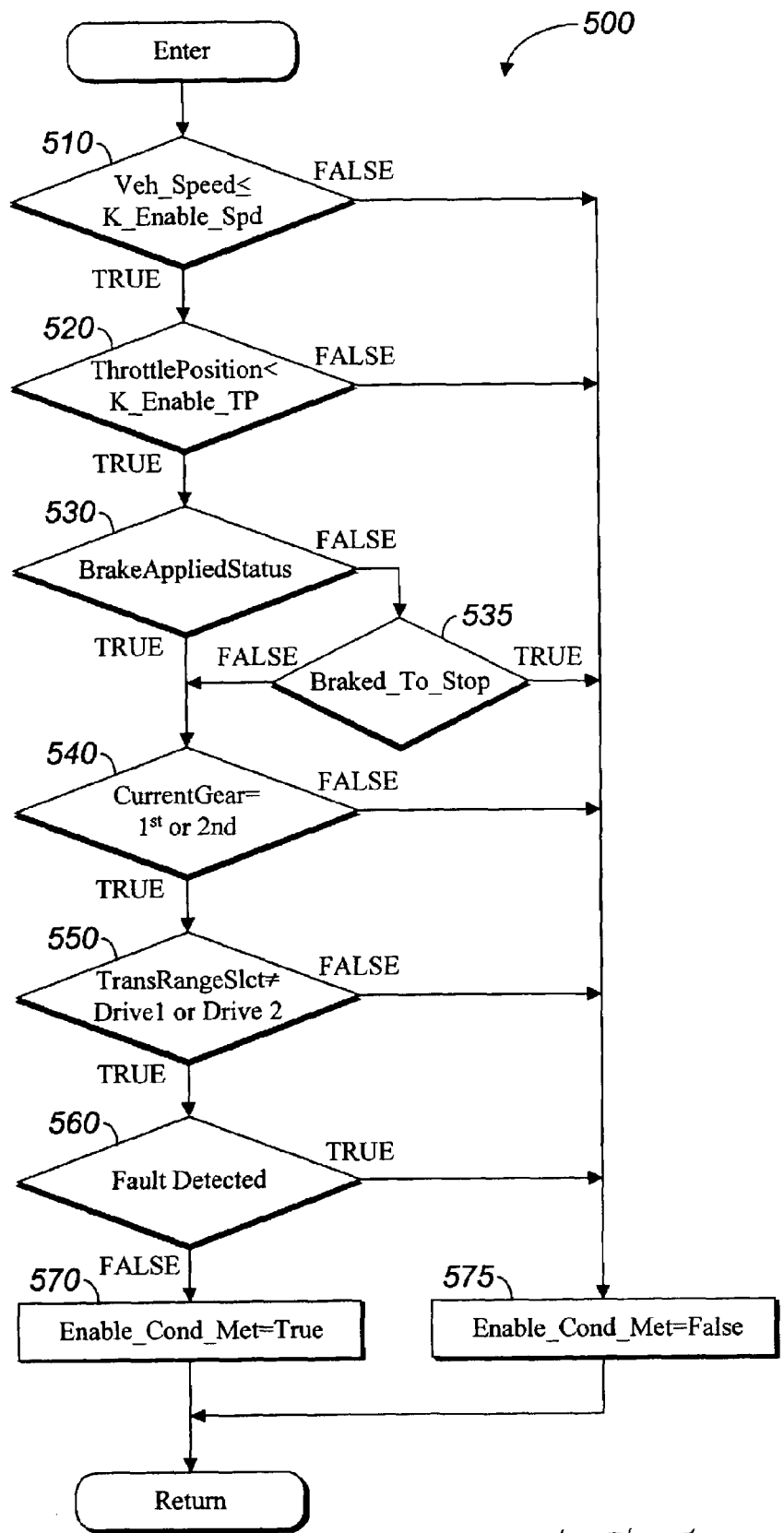
FIGS. 5, 6 and 7 are flow charts illustrating various sub-portions of the method shown in FIG. 4, further illustrating methods for determining enablement of the hill-holding mechanism and for detecting error conditions in a hill-holding mechanism in accordance with a preferred exemplary embodiment of the present invention.

Referring now to FIG. 5, a flow chart for a method 500 that provides more detailed information about step 450 of FIG. 4 is illustrated. As shown in FIG. 5, method 500 begins with step 510. Step 510 is a decision point to determine whether or not the value of the Veh_Speed variable is less than or equal to the value of the K_Enable_Spd variable. A typical value for K_Enable_Spd for this step is 0.7 MPH. If step 510 is true, then method 500 proceeds to step 520. If, however, step 510 is false, then method 500 proceeds to step 575 and sets the value of the Enable_Cond_Met variable to "False," completes its processing, and returns to method 400.

Step 520 is a decision point to determine whether or not the value of the ThrottlePosition variable is less than the value of the K_Enable_TP variable. A typical value of K_Enable_TP for this step is 0.2% of rotation. If step 520 is true, then method 500 proceeds to step 530. If, however, step 520 is false, then method 500 proceeds to step 575 and sets the value of the Enable_Cond_Met variable to "False," completes its processing, and returns to method 400.

Step 530 is a decision point to determine whether or not the value of the BrakeAppliedStatus variable is equal to either "True" or "False." If step 530 is true, then method 500 proceeds to step 540. If, however, step 530 is false, then method 500 proceeds to step 535 to check the status of the Braked_To_Stop variable. If the status of the Braked_To_Stop variable is equal to "False," then method 500 proceeds to step 540. If, however, the status of the Braked_To_Stop variable is equal to "True," then method 500 proceeds to step 575 and sets the value of the Enable_Cond_Met equal to "False," completes its processing, and returns to method 400.

Step 540 is a decision point to determine whether or not the value of the CurrentGear variable is equal to either of 1st or 2nd gears. If step 540 is true, then method 500 proceeds to step 550. If, however, step 540 is false, then method 500 proceeds to step 575 and sets the value of the Enable_Cond_Met equal to "False," completes its processing, and returns to method 400. It should be noted that if the driver of the hybrid vehicle has selected "Reverse," "Neutral," or "Park" as the transmission setting, it is most likely that that the driver is prepared for the possible backward movement of the vehicle. Accordingly, the hill-holding mechanism is not deployed in these circumstances.

Step 550 is a decision point to determine whether or not the driver of the vehicle has selected Drive1 or Drive2 as the gear for the transmission and the value of the TransRangeSlct variable is assigned a value of "True" if neither Drive1 or Drive2 are selected. Otherwise, the value of the TransRangeSlct variable is assigned a value of "False." Park, Reverse, and Neutral are gears that don't affect the implementation of the hill-holding mechanism and are not applicable for activating the hill-holding mechanism. When the vehicle transmission is in Park, then the output shaft of the transmission is held in place by other mechanisms. If the vehicle transmission is in Reverse, then the vehicle is supposed to roll backwards and the hill-holding mechanism is not activated. Similarly, if the vehicle transmission is in Neutral, then the vehicle is allowed to freewheel forwards or backwards. If step 550 is true, then method 500 proceeds to step 560. If, however, step 550 is false, then method 500 proceeds to step 575 and sets the value of the Enable_Cond_Met equal to "False," completes its processing, and returns to method 400.

Step 560 is a decision point to determine whether or not the value of the FaultDetected variable is equal to "True" of "False." If the value of the FaultDetected variable in step 560 is false, then method 500 proceeds to step 570. If, however, step 560 is true, then method 500 proceeds to step 575 and sets the value of the Enable_Cond_Met equal to "False," completes its processing, and returns to method 400.

At step 570, method 500 sets the value of the Enable_Cond_Met variable equal to "True," completes its processing, and returns to method 400.

Figure 6:
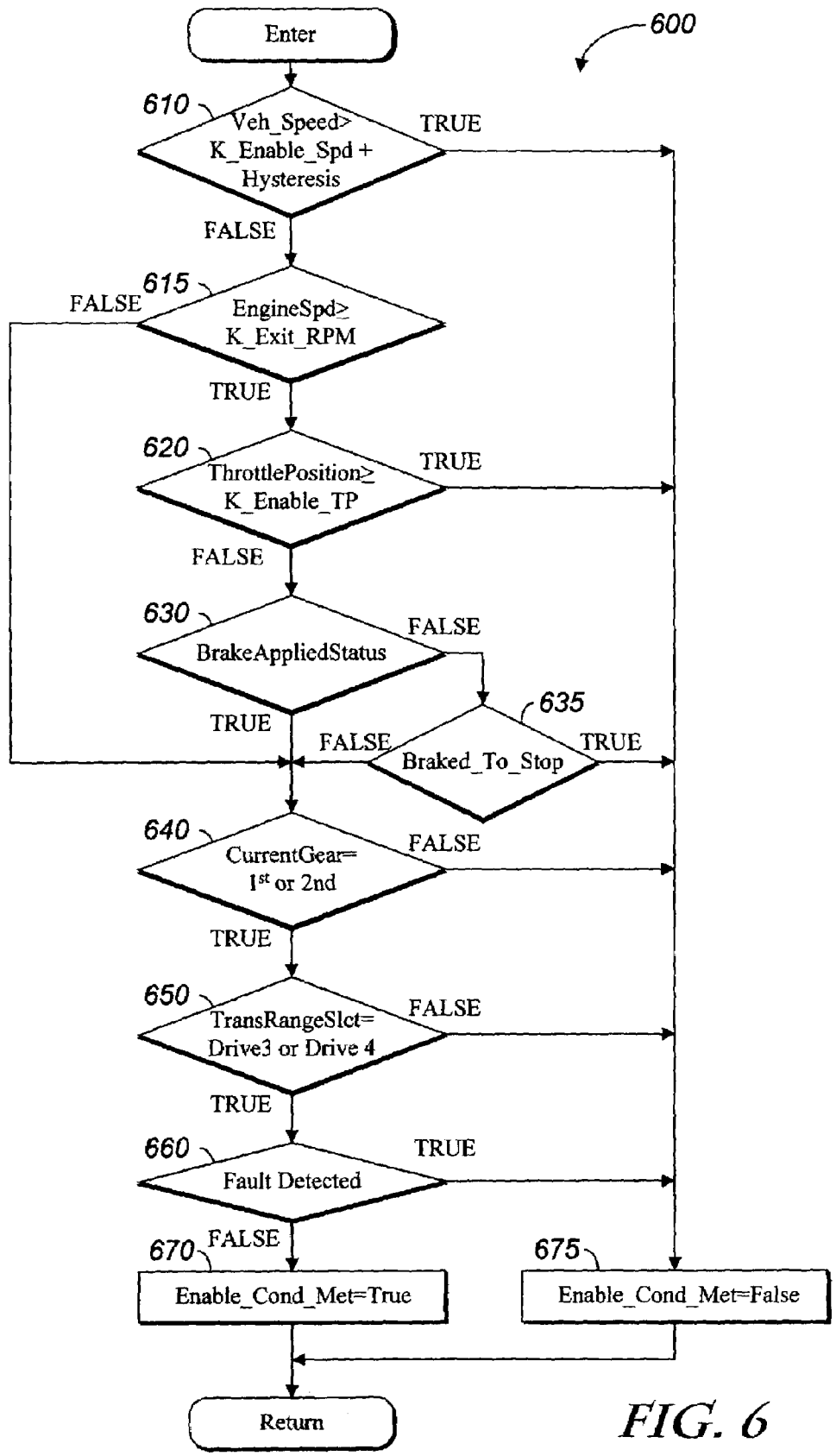

Referring now to FIG. 6, a flow chart for a method 600 that provides more detailed information about step 425 of FIG. 4 is illustrated. The main decisions for method 600 are to determine whether or not the brake and/or throttle are being activated so as to determine the applicability of activating the hill-holding mechanism of the present invention. As shown in FIG. 6, method 600 begins with step 610. Step 610 is a decision point to determine whether or not the value of the Veh_Speed variable is greater than the value of the K_Enable_Spd variable added to the value of the Hysteresis variable. If step 610 is false, then method 600 proceeds to step 615. If, however, step 610 is true, then method 600 proceeds to step 675 and sets the value of the Enable_Cond_Met variable to "False," completes its processing, and returns to method 400.

Step 615 is a decision point to determine whether or not the value of the EngineSpd variable is greater than or equal to the value of the K_Exit_RPM variable. A typical value of K_Exit_RPM for this step is 500 RPM. If step 615 is false, then method 600 skips steps 620 and 630 and proceeds to step 640. If, however, step 615 is true, then method 600 proceeds to step 620.

Step 620 is a decision point to determine whether or not the value of the ThrottlePosition variable is greater than or equal to the value of the K_Enable_TP variable. A typical value of K_Enable_TP for this step is 2.5% of rotation. If step 620 is false, then method 600 proceeds to step 630. If, however, step 620 is true, then method 600 proceeds to step 675 and sets the value of the Enable_Cond_Met variable to "False," completes its processing, and returns to method 400.

Step 630 is a decision point to determine whether or not the value of the BrakeAppliedStatus variable is equal to "True" of "False." If step 630 is true, then method 600 proceeds to step 640. If, however, step 630 is false, then method 600 proceeds to step 635 to check the status of the Braked_To_Stop variable. If the status of the Braked_To_Stop variable is equal to "False," then method 600 proceeds to step 640. If, however, the status of the Braked_To_Stop variable is equal to "True," then method 600 proceeds to step 675 and sets the value of the Enable_Cond_Met equal to "False," completes its processing, and returns to method 400.

Step 640 is a decision point to determine whether or not the value of the CurrentGear variable is equal to either of 1st or 2nd gears. If step 640 is true, then method 600 proceeds to step 650. If, however, step 640 is false, then method 600 proceeds to step 675 and sets the value of the Enable_Cond_Met equal to "False," completes its processing, and returns to method 400.

Step 650 is a decision point to determine whether or not the value of the TransRangeSlct variable is equal to either of the Drive3 or Drive4 variables. If step 650 is true, then method 600 proceeds to step 660. If, however, step 650 is false, then method 600 proceeds to step 675 and sets the value of the Enable_Cond_Met equal to "False," completes its processing, and returns to method 400.

Step 660 is a decision point to determine whether or not the value of the FaultDetected variable is equal to "True" or "False." If step 660 is false, then method 600 proceeds to step 670. If, however, step 660 is true, then method 600 proceeds to step 675 and sets the value of the Enable_Cond_Met equal to "False," completes its processing, and returns to method 400.

At step 670, method 600 sets the value of the Enable_Cond_Met variable equal to "True," completes its processing, and returns to method 400.

Figure 7:
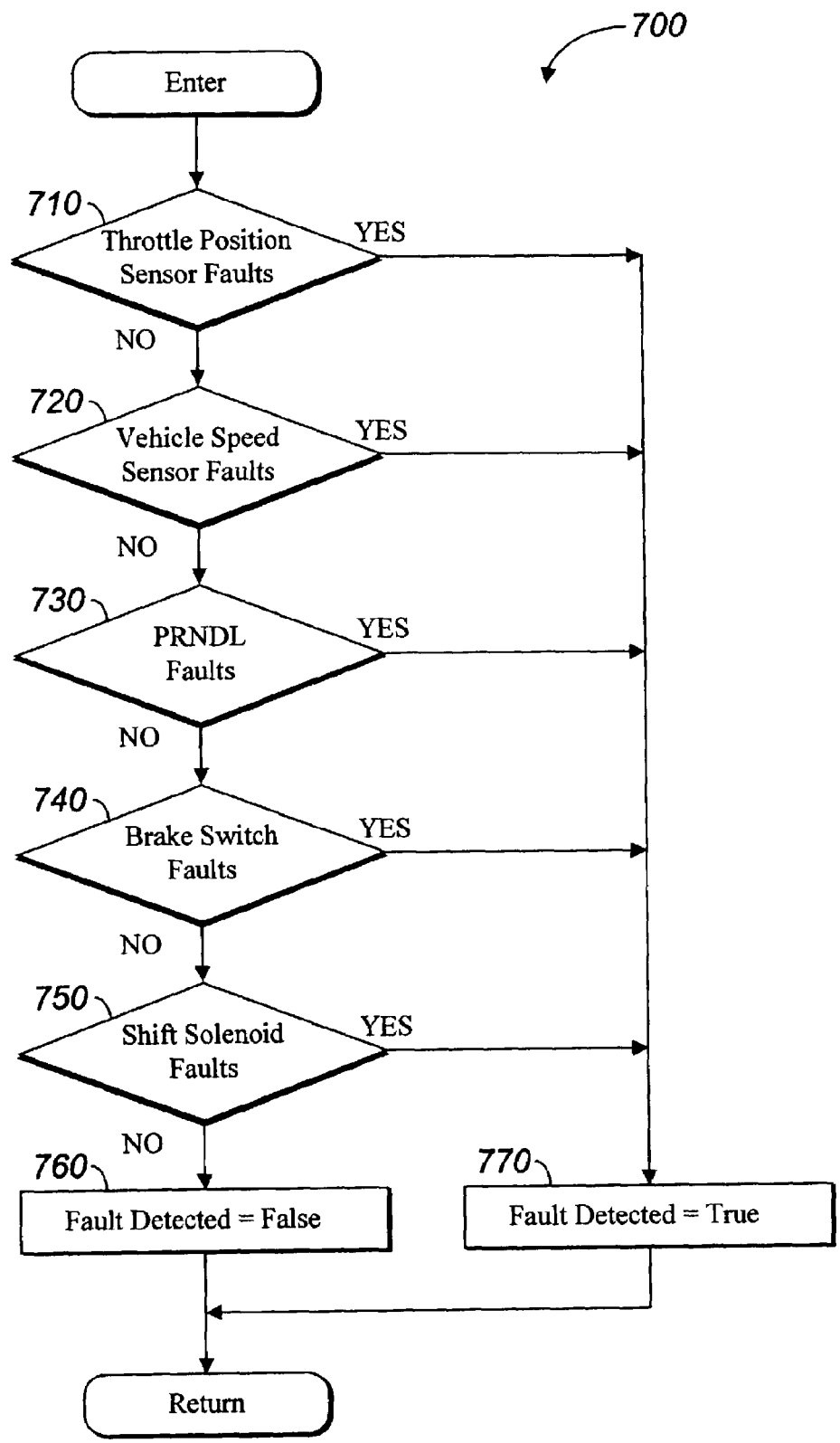

Referring now to FIG. 7, a flow chart for a method 700 that provides more detailed information about step 405 of FIG. 4 is illustrated. As shown in FIG. 7, method 700 begins with step 710. Step 710 is a decision point to determine whether or not there are any throttle position faults. If there are no throttle position faults, then method 700 proceeds to step 720. If, however, a throttle position fault is detected at step 710, then method 700 proceeds to step 770 and sets the value of the FaultDetected variable equal to "True," completes its processing, and returns to method 400.

Step 720 is a decision point to determine whether or not there are any faults in the vehicle speed sensors. If there are no vehicle speed sensors faults, then method 700 proceeds to step 730. If, however, a vehicle speed sensor fault is detected at step 720, then method 700 proceeds to step 770 and sets the value of the FaultDetected variable equal to "True," completes its processing, and returns to method 400.

Step 730 is a decision point to determine whether or not there are any faults in the transmission range. If there are no transmission range faults, then method 700 proceeds to step 740. If, however, a transmission range fault is detected at step 730, then method 700 proceeds to step 770 and sets the value of the FaultDetected variable equal to "True," completes its processing, and returns to method 400.

Step 740 is a decision point to determine whether or not there are any faults in the brake switch. If there are no brake switch faults, then method 700 proceeds to step 750. If, however, a brake switch fault is detected at step 740, then method 700 proceeds to step 770 and sets the value of the FaultDetected variable equal to "True," completes its processing, and returns to method 400.

Step 750 is a decision point to determine whether or not there are any faults in the shift solenoid. If there are no shift solenoid faults, then method 700 proceeds to step 760. If, however, a shift solenoid fault is detected at step 750, then method 700 proceeds to step 770 and sets the value of the FaultDetected variable equal to "True," completes its processing, and returns to method 400.

At step 760, method 700 sets the value of the FaultDetected variable equal to "False," completes its processing, and returns to method 400. It should be noted that any fault would cause the FaultDetected variable to have a value of "True" when method 700 returns to method 400 of FIG. 4. As previously discussed in conjunction with FIG. 4 above, if any of the vehicle sensor faults cause the FaultDetected variable to have a value of "True," then method 400 will not continue and the hill-holding mechanism will not be engaged or, if already engaged, it will be disengaged.

From the foregoing description, it should be appreciated that methods and apparatus are provided for a hill-holding mechanism implemented in conjunction with an automatic transmission for hybrid vehicles. While a preferred exemplary embodiment has been presented in the foregoing detailed description of a preferred exemplary embodiment, it should be appreciated that a vast number of variations in the embodiments exist. It should also be appreciated that this preferred exemplary embodiment is only an example, and is not intended to limit the scope, applicability, or configuration of the invention in any way. Rather, the foregoing detailed description provides those skilled in the art with a convenient road map for implementing a preferred exemplary embodiment of the invention. It should also be understood that various changes may be made in the function and arrangement of elements described in the exemplary preferred embodiment without departing from the spirit and scope of the invention as set forth in the appended claims.

The invention claimed is:

1. A method for immobilizing an output shaft of an automatic transmission in a hybrid vehicle, the method comprising the steps of:
    evaluating a plurality of status flags;
    in response to the status of the status flags, grounding a one-way clutch to said automatic transmission, thereby immobilizing a planet carrier connected to said one-way clutch; and
    simultaneously immobilizing a sun gear connected to an output shaft.

2. The method of claim 1, wherein said step of immobilizing a ring gear comprises the step of actuating a transmission control element, said transmission control element being connected to said sun gear.

3. The method of claim 2, wherein said step of actuating a transmission control element comprises the step of evaluating a plurality of variables prior to actuating said transmission control element.

4. The method of claim 3, wherein said step evaluating a plurality of variables prior to actuating said transmission control element comprises
    evaluating a plurality of enable conditions.

5. The method of claim 4, wherein said step evaluating a plurality of status flags comprises the steps of:
    checking for at least one throttle position sensor fault;
    checking for at least one vehicle speed sensor fault;
    checking for at least one brake switch fault; and
    checking for at least one shift solenoid sensor fault.

6. The method of claim 4, wherein said step evaluating a plurality of enable conditions comprises the steps of:
    evaluating a vehicle speed condition variable;
    evaluating for a throttle position variable;
    evaluating a brake status variable; and
    evaluating a transmission selection variable.

7. A method for immobilizing an output shaft of an automatic transmission in a hybrid vehicle, the method comprising the steps of:
    evaluating the status of a plurality of variables, comprising the step of evaluating a plurality of enable conditions:
    in response to the status of said plurality of said variables, grounding a sun gear to a transmission housing; and
    simultaneously grounding a one-way clutch to said transmission housing, said one-way clutch being connected to a planet carrier, thereby immobilizing said output shaft.

8. The method of claim 7, wherein said step of evaluating a plurality of variables prior to actuating said transmission control element comprises
    evaluating a plurality of status flags.

9. The method of claim 8, wherein said step evaluating a plurality of status flags comprises the steps of:
    checking for at least one throttle position sensor fault;
    checking for at least one vehicle speed sensor fault;
    checking for at least one brake switch fault; and
    checking for at least one shift solenoid sensor fault.

10. The method of claim 7, wherein said step evaluating a plurality of enable conditions comprises the steps of:
 evaluating a vehicle speed condition variable;
 evaluating for a throttle position variable;
 evaluating a brake status variable; and
 evaluating a transmission selection variable.

11. A method comprising the steps of:
 grounding a one-way clutch to a transmission housing, thereby immobilizing a planet carrier connected to said one-way clutch; and
 in response to a signal, simultaneously immobilizing a ring gear connected to an output shaft;
 evaluating a plurality of variables prior to actuating said transmission control element, comprising the steps of:
 evaluating a plurality of status flags; and
 evaluating a plurality of enable conditions; and
 wherein said step of evaluating a plurality of status flags comprises the steps of:
 checking for at least one throttle position sensor fault;
 checking for at least one vehicle speed sensor fault;
 checking for at least one brake switch fault; and
 checking for at least one shift solenoid sensor fault.

* * * * *